United States Patent
Adsit

(10) Patent No.: US 6,328,365 B1
(45) Date of Patent: Dec. 11, 2001

(54) INTEGRATED BED DRAWER ASSEMBLY FOR VEHICLES

(75) Inventor: Daniel Mark Adsit, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/440,604

(22) Filed: Nov. 15, 1999

(51) Int. Cl.$^7$ .............. B60R 5/04; B60R 9/06; B60R 7/04; B60R 11/06

(52) U.S. Cl. ............ 296/37.6; 296/37.14; 296/37.15; 296/37.16; 296/148

(58) Field of Search .............. 296/37, 24.1, 148, 296/190.11

(56) References Cited

U.S. PATENT DOCUMENTS

| | | | |
|---|---|---|---|
| 1,946,633 | 2/1934 | Meyer . | |
| 2,720,414 | 10/1955 | Hart . | |
| 3,012,814 | 12/1961 | Penner . | |
| 3,146,824 | 9/1964 | Veilleux . | |
| 3,245,713 | 4/1966 | Ogilvie . | |
| 4,124,247 | 11/1978 | Penner . | |
| 4,126,349 | 11/1978 | Nelson et al. . | |
| 4,252,362 | 2/1981 | Cambell . | |
| 4,313,636 | 2/1982 | Deeds . | |
| 4,372,601 | 2/1983 | Smith | 296/50 |
| 4,563,034 | 1/1986 | Lamb . | |
| 4,632,446 | 12/1986 | Douglas . | |
| 4,685,695 * | 8/1987 | LeVee | 296/37.6 |
| 4,733,898 * | 3/1988 | Williams | 296/24 |
| 4,750,773 | 6/1988 | Chapline et al. | 296/37.6 |
| 4,786,099 | 11/1988 | Mount . | |
| 4,795,206 | 1/1989 | Adams . | |
| 4,828,312 | 5/1989 | Kinkel et al. | 296/37.6 |
| 4,850,519 * | 7/1989 | Farmer, Jr. | 296/37.6 |
| 4,861,096 | 8/1989 | Hastings . | |
| 4,915,437 * | 4/1990 | Cherry | 296/37.6 |
| 4,917,430 * | 4/1990 | Lawrence | 296/37.6 |
| 4,930,836 | 6/1990 | Grinn . | |
| 4,974,898 | 12/1990 | Baranski | 296/100.03 |
| 5,037,153 * | 8/1991 | Stark | 296/37.6 |
| 5,102,180 | 4/1992 | Finley . | |
| 5,125,710 * | 6/1992 | Gianelo | 296/37.1 |
| 5,127,701 | 7/1992 | Miller . | |
| 5,147,103 | 9/1992 | Ducote | 296/37.6 |
| 5,183,309 | 2/1993 | Jordan . | |
| 5,188,414 | 2/1993 | Burnham et al. . | |
| 5,201,561 | 4/1993 | Brown | 296/37.6 X |
| 5,251,950 | 10/1993 | Bernardo . | |
| 5,267,773 | 12/1993 | Kalis, Jr. et al. . | |
| 5,316,358 | 5/1994 | Payne et al. | 296/37.6 |
| 5,350,213 | 9/1994 | Bernardo . | |
| 5,398,987 | 3/1995 | Sturgis . | |
| 5,421,645 | 6/1995 | Young . | |
| 5,498,048 * | 3/1996 | Shelby, Jr. | 296/24.1 |
| 5,564,776 | 10/1996 | Schlachter . | |
| 5,567,000 * | 10/1996 | Clare | 296/37.6 |
| 5,615,922 * | 4/1997 | Blanchard | 296/37.6 |
| 5,743,589 | 4/1998 | Felker . | |
| 5,845,952 * | 12/1998 | Albertini et al. | 296/37.6 |
| 5,853,116 | 12/1998 | Schreiner | 224/404 |
| 5,895,086 * | 4/1999 | Carico | 296/37.6 |
| 5,897,154 * | 4/1999 | Albertini et al. | 296/37.6 |
| 5,899,544 * | 5/1999 | James et al. | 296/37.6 |
| 5,924,615 * | 7/1999 | McGarrah | 296/37.6 |
| 6,000,740 * | 12/1999 | Hall et al. | 296/37.6 |
| 6,003,924 * | 12/1999 | Nicol et al. | 296/37.6 |
| 6,012,754 * | 1/2000 | Clare et al. | 296/37.6 |

FOREIGN PATENT DOCUMENTS 247211   9/1994   (JP) .

* cited by examiner

Primary Examiner—Joseph D. Pape
Assistant Examiner—Greg Blankenship
(74) Attorney, Agent, or Firm—David B. Kelly

(57) ABSTRACT

An integrated bed drawer assembly is provided for a vehicle having a bed with a floor and sides extending upwardly and along the sides. The integrated bed drawer assembly includes a plurality of rails adapted to be spaced longitudinally and extend laterally between the sides above the floor of the bed. The integrated bed drawer assembly also includes a drawer operatively cooperating with the rails for sliding movement therealong.

19 Claims, 4 Drawing Sheets

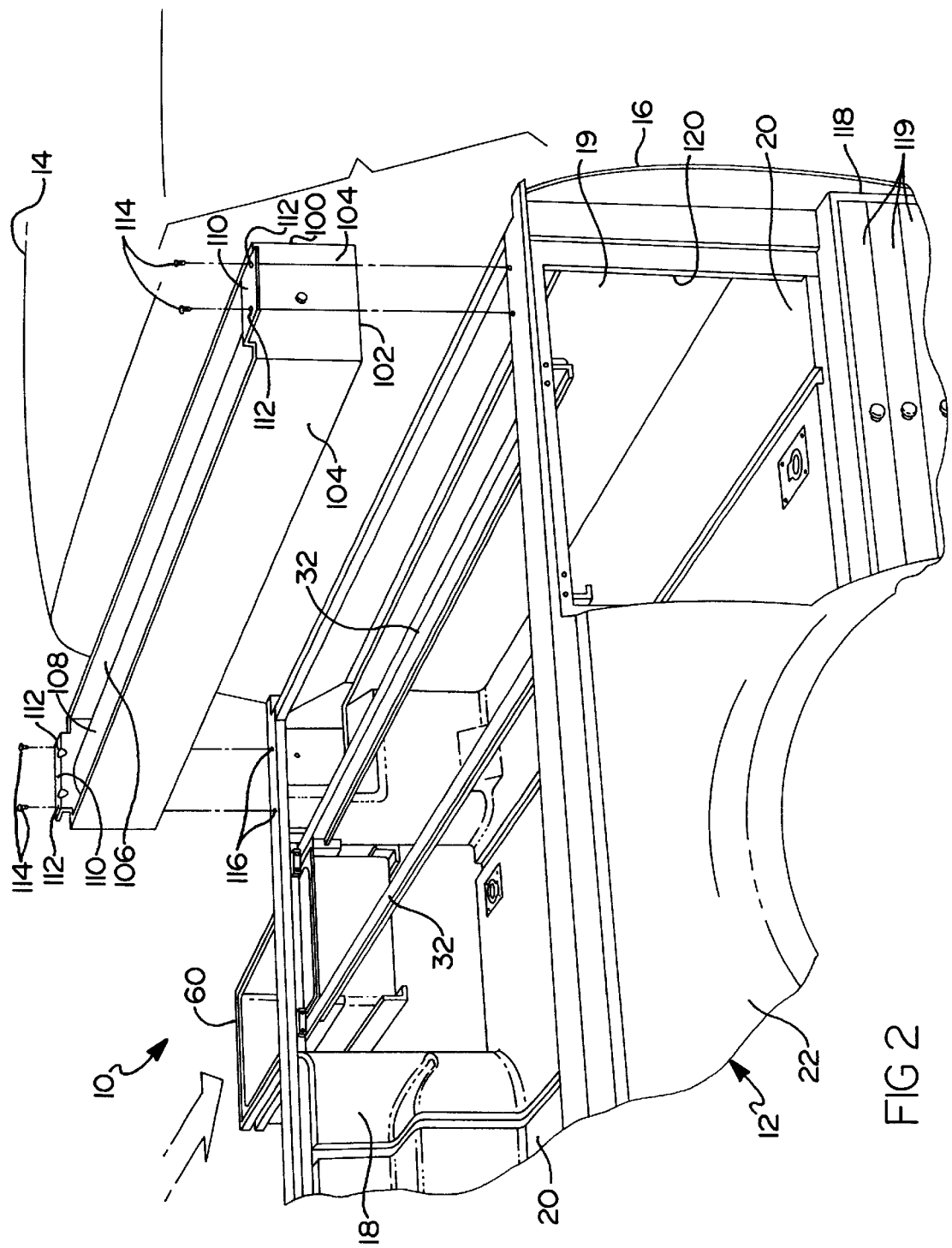

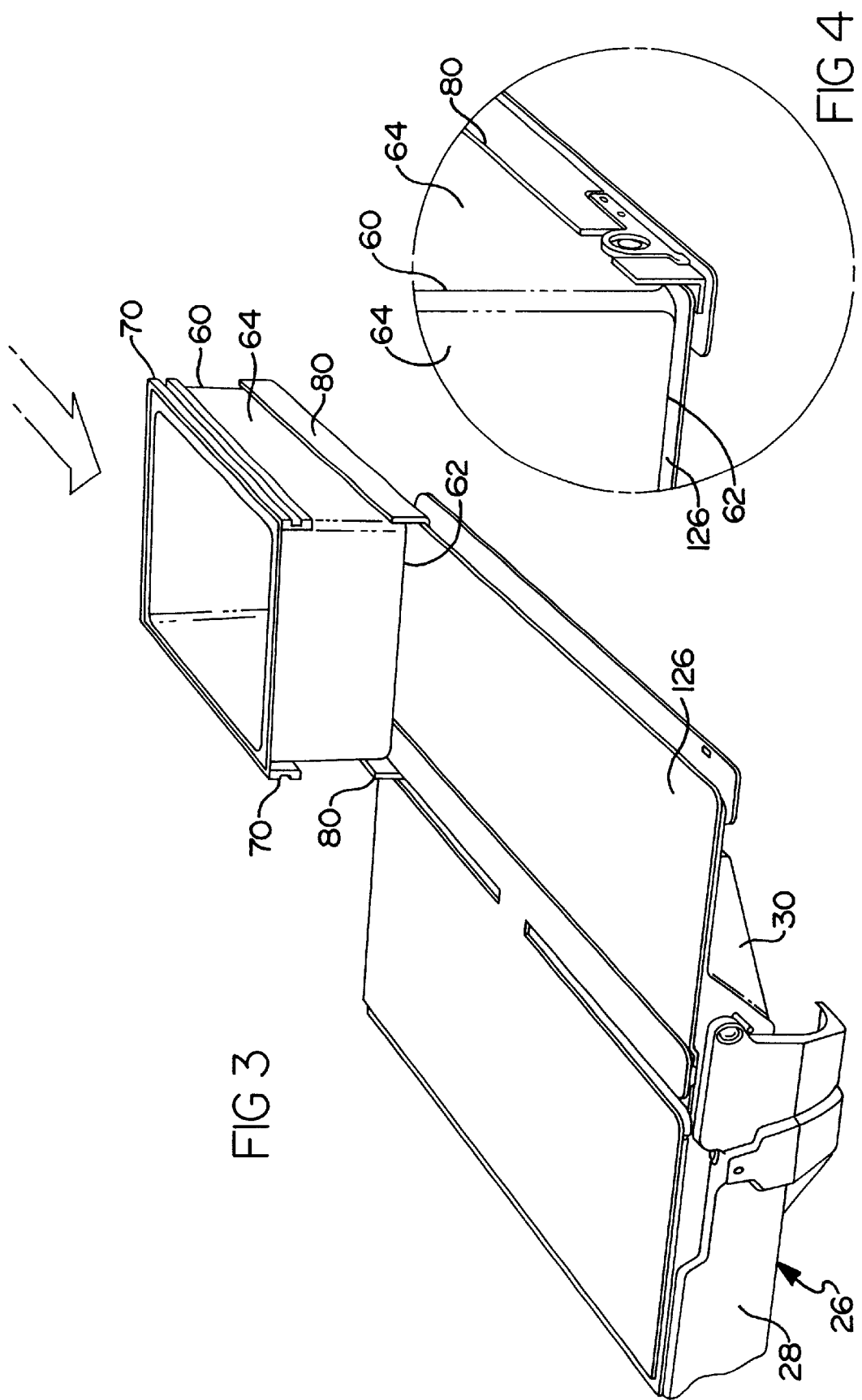

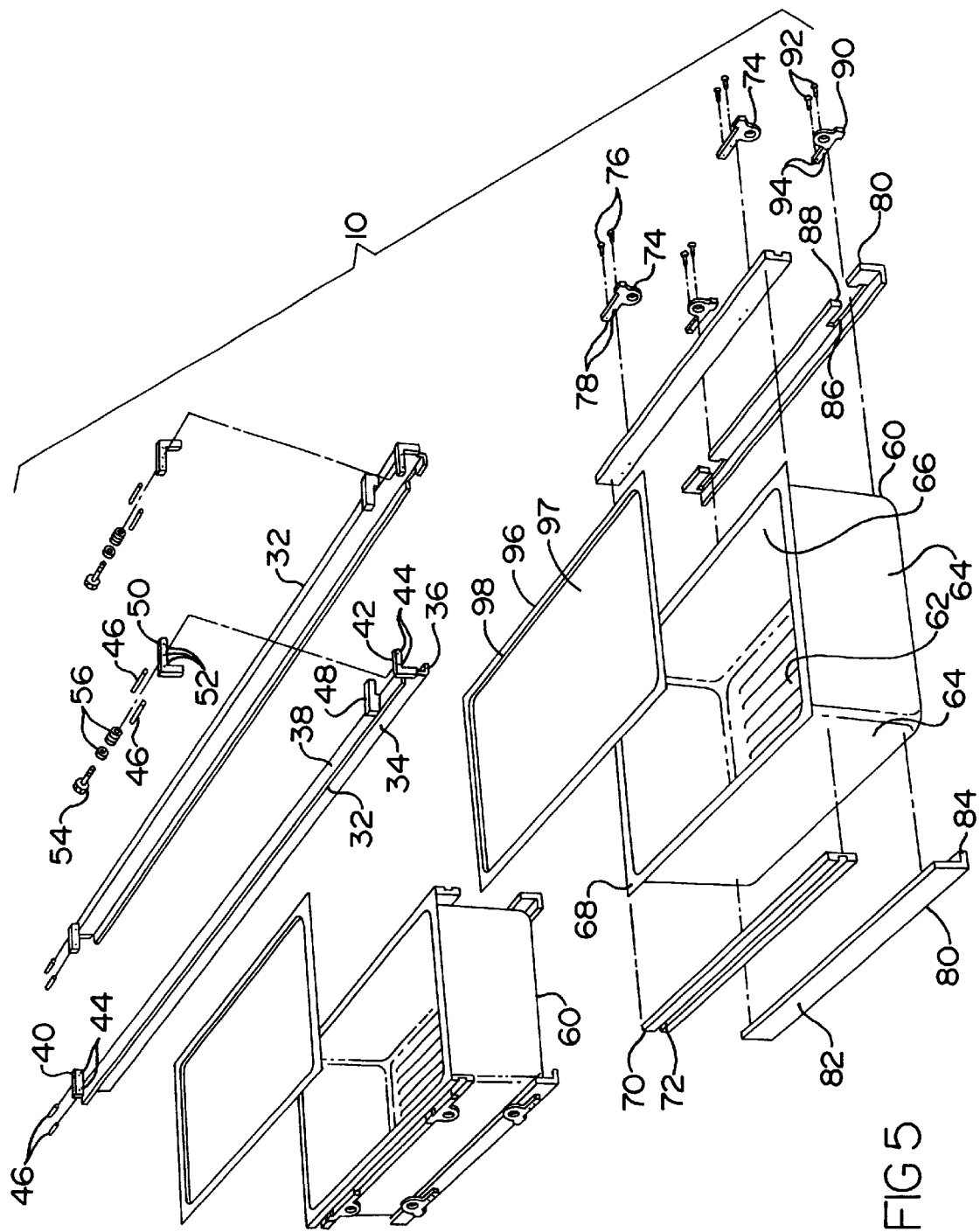

INTEGRATED BED DRAWER ASSEMBLY FOR VEHICLES

BACKGROUND OF THE INVENTION

1. Field of the Invention

The present invention relates generally to beds for vehicles and, more specifically, to an integrated bed drawer assembly for a bed of a vehicle.

2. Description of the Related Art

It is known to provide a bed for a vehicle such as a pick-up truck. Typically, the bed is rectangular in shape to define a cargo area and is closed at the end by a tailgate. The tailgate is hinged to the bed to have an upright position to close the end of the bed and a down position to open the end of the bed.

It is known to provide a toolbox assembly for a bed of a vehicle. An example of such a toolbox assembly is disclosed in U.S. Pat. No. 5,398,987. In this patent, the toolbox assembly has a storage container affixed to the bed of a pick-up truck and a toolbox pivotally attached to the storage container.

One disadvantage of the above toolbox assembly is that it does not allow use of the full bed length. Another disadvantage is that the above toolbox assembly does not allow easy/hidden access for tools. A further disadvantage is that the above toolbox assembly is not integrated with the bed of the vehicle. Yet a further disadvantage is that the above toolbox assembly is not removable or slideable through side access panels of the vehicle.

SUMMARY OF THE INVENTION

Accordingly, the present invention is an integrated bed drawer assembly for a vehicle having a bed with a floor and sides extending upwardly along the edge of the floor. The integrated bed drawer assembly includes a plurality of rails adapted to be spaced longitudinally and extend laterally between the sides above the floor of the bed. The integrated bed drawer assembly also includes a drawer operatively cooperating with the rails for sliding movement therealong.

One advantage of the present invention is that an integrated bed drawer assembly is provided for a vehicle such as a pick-up truck. Another advantage of the present invention is that the integrated bed drawer assembly has removable, slideable drawers through side access panels of the vehicle and integrated toolboxes under the floor of the bed of the vehicle. Yet another advantage of the present invention is that the integrated bed drawer assembly allows for easy/hidden access for tools and the use of the full bed length of the vehicle.

Other features and advantages of the present invention will be readily appreciated, as the same becomes better understood after reading the subsequent description when taken in conjunction with the accompanying drawings.

BRIEF DESCRIPTION OF THE DRAWINGS

FIG. 2 is an exploded perspective view of the integrated bed drawer assembly and vehicle of FIG. 1.

FIG. 3 is a perspective view of a portion of the integrated bed drawer assembly of FIG. 1.

FIG. 4 is an enlarged perspective view of a portion of the integrated bed drawer assembly in circle 4 of FIG. 3.

FIG. 5 is an exploded perspective view of the integrated bed drawer assembly of FIG. 1.

DESCRIPTION OF THE PREFERRED EMBODIMENT(S)

Figure 1:
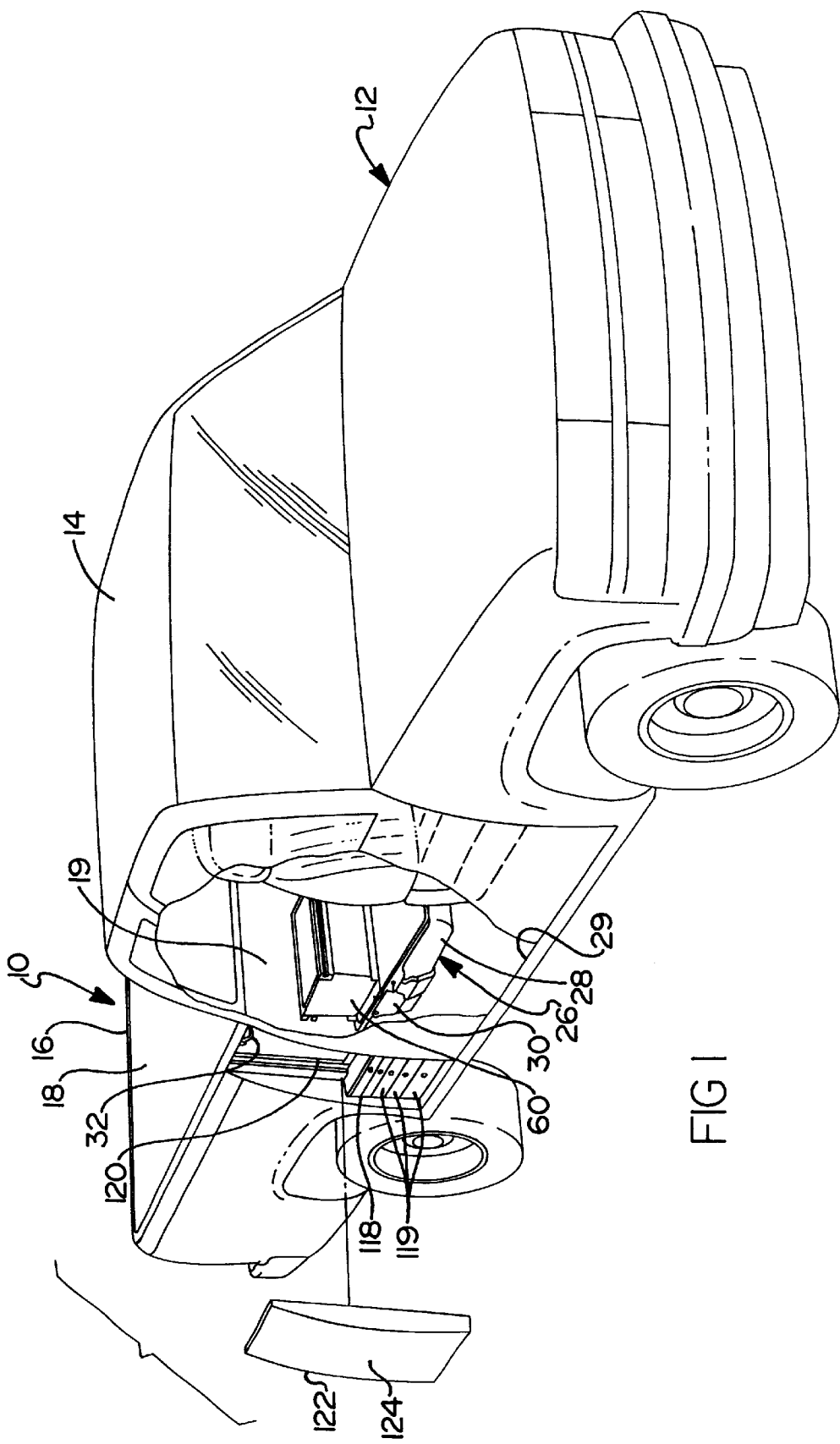
FIG. 1 is a perspective view of an integrated bed drawer assembly, according to the present invention, illustrated in operational relationship with a vehicle.

Referring now to the drawings and in particular FIGS. 1 and 2, one embodiment of an integrated bed drawer assembly 10, according to the present invention, is illustrated in connection with a vehicle such as a pick-up truck, generally indicated at 12. Such pick-up trucks 12 typically include a cab 14 and a bed 16 forming a cargo area 18. The bed 16 includes a front 19, floor 20, two sides 22 and a rear tailgate 24, which define the cargo area 18. The pick-up truck 12 also includes a seat, generally indicated as 26, disposed in the cab 14. The seat 26 includes a generally horizontal seat cushion portion or seat cushion 28 mounted to vehicle structure 29 such as a floorpan and a generally upright seat back portion or seat back 30 pivotally connected to the seat cushion 28 by a seat back pivot (not shown). It should be appreciated that, except for the integrated bed drawer assembly 10, the pickup truck 12 is conventional and known in the art.

Referring to FIGS. 2 and 5, the integrated bed drawer assembly 10 includes a plurality of, preferably a pair of rails 32 spaced longitudinally and extending laterally between the sides 22 above the floor 20 of the bed 16. The rails 32 have a generally L shape with a generally vertical first or side portion 34 and a generally horizontal second or base portion 36. The rails 32 also have a flange 38 extending outwardly and generally perpendicular to the side portion 34. The rails 32 have first and second bracket members 40 and 42, respectively, at the ends thereof for attaching the rails 32 to the sides 22. The first bracket member 40 is generally rectangular in shape and the second bracket member 42 is generally an inverted L shape. The first and second bracket members 40 and 42 each have at least one, preferably a pair of apertures 44 extending therethrough to receive fasteners 46 such as pins to attach the brackets 40 and 42 to the sides 22. The rails 32 each include a stop member 48 attached to the flange 38 and spaced laterally from the second bracket 42. The stop member 48 extends longitudinally for a function to be described. The rails 32 are made of a rigid material such as metal. The integrated bed drawer assembly 10 may include an additional or third bracket member 50 to secure the second bracket 42 to the side 22. The third bracket member 50 has a generally inverted L shape and at least one, preferably a plurality of apertures 52 extending therethrough. The fasteners 46 also extend through the apertures 52 of the third bracket member 50. The integrated bed drawer assembly 10 may include a fastener 54 such as a screw extending through washers 56 and an aperture 52 to secure the bracket members 42 and 50 to the side 22.

The integrated bed drawer assembly 10 also includes at least one, preferably a plurality of boxes or drawers 60 for cooperating with the rails 32. The drawer 60 has a bottom 62 and sides 64 generally perpendicular to the bottom 62 to form a cavity or chamber 66 therein. The drawer 60 also has a flange 68 extending generally outwardly and perpendicular to the sides 64. The drawer 60 is generally rectangular in shape. The drawer 60 is made of a rigid material such as metal or plastic. It should be appreciated that the drawer 60 is used to hold objects such as tools therein.

The integrated bed drawer assembly 10 also includes a slide 70 disposed adjacent to and underneath the flanges 68 on opposed sides and attached to the sides 64 of the drawer 60. The slides 70 extend laterally and are generally rectangular in shape. The slides 70 include a groove 72 extending laterally therealong to receive the base portion 36 of the rails 32 for sliding therealong. The integrated bed drawer assembly 10 also includes at least one, preferably a pair of brackets 74 and fasteners 76 such as screws extending through apertures 78 in the brackets 74 to attach the slides 70 to the sides 64 of the drawer 60.

The integrated bed drawer assembly 10 includes a plurality of, preferably a pair of tracks 80 attached to the sides 64 of the drawer 60. The tracks 80 are generally L shaped shape with a generally vertical first or side portion 82 and a generally horizontal second or base portion 84. The tracks 80 are made of a rigid material such as metal. The tracks 80 include at least one, preferably a pair of slots 86 extending laterally along the side portion 82 and having an opening 88 extending upwardly and therethrough. The integrated bed drawer assembly 10 also includes at least one, preferably a pair of brackets 90 and fasteners 92 such as screws extending through apertures 94 in the brackets 90 to attach the tracks 80 to the sides 64 of the drawer 60. The brackets 90 are disposed adjacent the slots 86.

The integrated bed drawer assembly 10 may include a cover 96 for the drawer 60. The cover 96 has a base 97 that is generally rectangular in shape and a flange 98 extending outwardly from the base 97 to overlap the flange 68 of the drawer 60. The cover 96 is made of a rigid material such as metal or plastic. It should be appreciated that the cover 96 may be hinged to the drawer 60.

The vehicle 12 may include a tonneau cover housing 100 extending laterally between the sides 22 of the bed 16 adjacent the front 19 thereof. The tonneau cover housing 100 is generally rectangular in shape. The tonneau cover housing 100 has a bottom 102 and sides 104 extending generally perpendicular thereto to form a chamber 106 to house a tonneau cover 108 therein. The tonneau cover housing 100 also includes a flange 110 at each lateral end extending generally perpendicular to the sides 104 and having at least one, preferably a pair of apertures 112 extending therethrough. The tonneau cover housing 100 is secured to the sides 22 by fasteners 114 such as screws extending through the apertures 112 in the flanges 110 and apertures 116 in the sides 22. It should be appreciated that the rails 32 can be removed and stored under the tonneau cover housing 100 to allow use of the full length of the bed 16.

The vehicle 12 may include a toolbox 118 stored beneath the floor 20 of the bed 16. The toolbox 118 has at least one, preferably a plurality of drawers 119 similar to a "Craftsman" toolbox. The toolbox 118 is attached to the underside of the floor 20 of the bed 16. It should be appreciated that the drawers 119 are movable relative to the toolbox 118 to allow access therein.

Referring to FIGS. 1 and 2, the vehicle 12 further includes a side access opening 120 on each side 22 thereof near the front 19 of the bed 16 and aligned with the rails 32 to allow the drawers 60 to be removed through the sides 22 of the bed 16. The side access opening 120 is generally rectangular in shape and extends beneath the floor 20 of the bed 16 to reveal the toolbox 118. The vehicle 12 also includes a side access panel 122 to close each side access opening 120. The side access panel 122 has an outer surface 124 substantially flush with the outer surface of the sides 22 when disposed in the side access opening 120. The side access panel 122 is secured to the sides 22 by suitable means such as fasteners (not shown).

In operation of the integrated bed drawer assembly 10, during normal operating conditions, the drawers 60 are suspended on the rails 32 in the cargo area 18 of the bed 16. The drawers 60 are used to hold objects and may be slid along the rails 32. If it is desirable to use the full length of the bed 16 or all the cargo area 18, the side access panels 122 may be removed and the drawers 60 slid along the rails 32 and through the side access opening 120. The drawers 60 are slid off the rails 32 for remote storage. The rails 32 may also be removed from the sides 22 for remote storage or storage under the tonneau cover housing 100. It should be appreciated that the side access panel 122 may be removed for access to the toolbox 118. It should also be appreciated that the side access panel 122 is disposed back in the side access opening 120 once the drawers 60 and/or rails 32 are removed.

Referring to FIGS. 3 and 4, when the drawer 60 is removed from the cargo area 18 of the bed 16, the drawer 60 may be stored in the interior of the cab 14. In this state, the seat back 30 is folded down over the seat cushion 28. The tracks 80 engage a remote mounting member such a back support member 126 on the seat back 30 such that the back support member 126 is disposed between the tracks 80 and the bottom 62 of the drawer 60. The drawer 60 is slid relative to the back support member 126 to securely store the drawer 60 thereon. It should be appreciated that, in this state, the full length of the bed 16 may be utilized.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An integrated bed drawer assembly for a vehicle having a bed with a floor and sides extending upwardly and along edges of the floor, said integrated bed drawer assembly comprising:

a plurality of rails adapted to be spaced longitudinally and extend laterally between the sides above the floor of the bed;

a drawer operatively cooperating with said rails for sliding movement therealong; and a pair of slides disposed on opposed sides of said drawer and having a groove for receiving a portion of said rails.

2. An integrated bed drawer assembly for a vehicle having a bed with a floor and sides extending upwardly and along edges of the floor, said integrated bed drawer assembly comprising:

a plurality of rails adapted to be spaced longitudinally and extend laterally between the sides above the floor of the bed;

a drawer operatively cooperating with said rails for sliding movement therealong; and a pair of tracks disposed on opposed sides of said drawer for receiving a portion of a remote mounting member when removed from said rails.

3. An integrated bed drawer assembly for a vehicle having a bed with a floor and sides extending upwardly and along edges of the floor, said integrated bed drawer assembly comprising:

a plurality of rails adapted to be spaced longitudinally and extend laterally between the sides above the floor of the bed;

a drawer operatively cooperating with said rails for sliding movement therealong; and fastening means for removably securing said rails to the sides of the bed.

4. An integrated bed drawer assembly as set forth in claim 1 including fastening means for securing said slides to said drawer.

5. An integrated bed drawer assembly as set forth in claim 2 including fastening means for securing said tracks to said drawer.

6. An integrated bed drawer assembly as set forth in claim 4 wherein said drawer comprises a bottom and sides extending generally perpendicular to said bottom to form a chamber for holding objects.

7. An integrated bed drawer assembly for a vehicle having a bed with a floor and sides extending upwardly and along edges of the floor, said integrated bed drawer assembly comprising:
  a plurality of rails adapted to be spaced longitudinally and extend laterally between the sides above the floor of the bed;
  a drawer operatively cooperating with said rails for sliding movement therealong;
  wherein said drawer comprises a bottom and sides extending generally perpendicular to said bottom to form a chamber for holding objects; and
  a cover being removable from s aid d rawer for covering said chamber.

8. A vehicle comprising:
  a bed having a front, floor and sides extending upwardly and along edges of said floor;
  a plurality of rails located below a top of said sides of said bed and spaced longitudinally and extending laterally between said sides above said floor of said bed; and
  a drawer extending below the top of said sides of said bed and having slides operatively cooperating with said rails for sliding movement therealong.

9. A vehicle as set forth in claim 8 including a side access opening extending through said sides adjacent said rails.

10. A vehicle as set forth in claim 9 including a side access panel removably secured to said sides to cover said side access opening.

11. A vehicle comprising:
  a bed having a front, floor and sides extending upwardly and along edges of said floor;
  a plurality of rails spaced longitudinally and extending laterally between said sides above said floor of said bed;
  a drawer operatively cooperating with said rails for sliding movement therealong;
  a side access opening extending through one of said sides adjacent said rails;
  a side access panel removably secured to the one of said sides to cover said side access opening; and
  a toolbox disposed beneath said floor and having a plurality of drawers that are accessible when said side access panel is removed from said side access opening.

12. A vehicle comprising:
  a bed having a front, floor and sides extending upwardly and along edges of said floor;
  a plurality of rails spaced longitudinally and extending laterally between said sides above said floor of said bed;
  a drawer operatively cooperating with said rails for sliding movement therealong; and
  a tonneau cover housing extending between said sides above said floor and adjacent said front of said bed.

13. A vehicle comprising:
  a bed having a front, floor and sides extending upwardly and along edges of said floor;
  a plurality of rails spaced longitudinally and extending laterally between said sides above said floor of said bed;
  a drawer operatively cooperating with said rails for sliding movement therealong; and
  a pair of slides disposed on opposed sides of said drawer and having a groove for receiving a portion of said rails.

14. A vehicle comprising:
  a bed having a front, floor and sides extending upwardly and along edges of said floor;
  a plurality of rails spaced longitudinally and extending laterally between said sides above said floor of said bed;
  a drawer operatively cooperating with said rails for sliding movement therealong; and
  a pair of tracks disposed on opposed sides of said drawer for receiving a portion of a remote mounting member when removed from said rails.

15. A vehicle as set forth in claim 8 wherein said drawer comprises a bottom and sides extending generally perpendicular to said bottom to form a chamber for holding objects.

16. A vehicle as set forth in claim 15 including a cover operatively cooperating with said drawer for covering said chamber.

17. A vehicle as set forth in claim 8 including fastening means for removably securing said rails to the sides of the bed.

18. A vehicle comprising:
  a bed having a front, floor and sides extending upwardly and along edges of said floor;
  a plurality of rails spaced longitudinally and extending laterally between said sides above said floor of said bed;
  a drawer having operatively cooperating with said rails for sliding movement therealong.
  a pair of slides disposed on opposed sides of said drawer for cooperating with said rails;
  a pair of tracks disposed on opposed sides of said drawer for receiving a portion of a remote mounting member when removed from said rails; and
  fastening means for securing said slides and said tracks to said drawer.

19. A pick-up truck comprising:
  a bed having a front, floor and sides extending upwardly and along edges of said floor;
  a plurality of rails located below a top of said sides of said bed and spaced longitudinally and extending laterally between said sides above said floor of said bed;
  a drawer extending below the top of said sides of said bed and having slides operatively cooperating with said rails for sliding movement therealong;
  a side access opening extending through at least one of said sides adjacent said rails and said front of said bed; and
  a side access panel removably secured to the at least one of said sides to cover said side access opening and allow said drawer to be removed through said side access opening.

* * * * *